(12) United States Patent
Ma et al.

(10) Patent No.: US 7,969,563 B2
(45) Date of Patent: Jun. 28, 2011

(54) LENS MEASURING DEVICE AND METHOD APPLIED THEREIN

(75) Inventors: Chien-Ching Ma, Taipei (TW);
Ching-Yuan Chang, Taiwan (TW);
Kuo-Cheng Huang, Taiwan (TW);
Shih-Feng Tseng, Taipei (TW)

(73) Assignees: National Taiwan University, Taipei (TW); National Applied Research Laboratories, Hsinchu (TW)

( * ) Notice: Subject to any disclaimer, the term of this patent is extended or adjusted under 35 U.S.C. 154(b) by 177 days.

(21) Appl. No.: 12/361,911

(22) Filed: Jan. 29, 2009

(65) Prior Publication Data
US 2009/0251689 A1    Oct. 8, 2009

(30) Foreign Application Priority Data

Apr. 2, 2008   (TW) ............................... 97111948 A (51) Int. Cl.
*G01B 9/00*    (2006.01)
(52) U.S. Cl. ....................................... 356/124; 356/127
(58) Field of Classification Search ........... 356/124–128
See application file for complete search history.

(56) References Cited

U.S. PATENT DOCUMENTS

| 4,035,082 A * | 7/1977 | Kirschen .................... 356/364 |
| 6,266,141 B1 * | 7/2001 | Morita ........................ 356/365 |
| 2009/0323064 A1 * | 12/2009 | Wang ........................ 356/365 |

* cited by examiner

*Primary Examiner* — Michael P Stafira
(74) *Attorney, Agent, or Firm* — Peter F. Corless; Steven M. Jensen; Edwards Angell Palmer & Dodge LLP (57) ABSTRACT

A lens measuring device and method applied therein. The lens measuring device includes a light source, a first polarizer, a second polarizer, and an image analysis module. The method includes enabling the light source to orderly pass through the first polarizer, a lens to be measured, and the second polarizer to generate a light beam to be measured, and then enabling the image analysis module to analyze image-related information of the light beam to be measured, consequently deducing the structural center and energy distribution of the lens to be measured, and then further analyzing errors in polarity and skewness of the lens to be measured. By applying a common light source, the method is spared complicated correction that is otherwise required when a conventional collimating laser light source is applied, and the method can also easily and simultaneously test a plurality of lenses to be measured.

19 Claims, 7 Drawing Sheets

LENS MEASURING DEVICE AND METHOD APPLIED THEREIN

BACKGROUND OF THE INVENTION

1. Field of the Invention

This invention generally relates to a lens measuring device and method applied therein, and, more specifically, to a device for measuring lens polarity and skewness and method applied therein.

2. Description of Related Art

Optical lenses come in various types according to application scope and material composition. Optical lenses can be fabricated by many different quick mass production techniques. However, no matter what technique is adopted, accuracy is always a very important quality parameter for optical lenses.

In order to ensure accuracy of optical lenses, measuring techniques are employed, but such techniques must be able to be applied quickly in order to keep up with the mass production line and to reduce costs. Thus, the technique of measuring optical lens accuracy has become important. Therefore, after achieving the objective of efficient mass production, manufacturers and designers in the lens industry have turned their attention to how to provide a fast and easy measuring method at low testing cost for achieving the objective of ensuring optical lens accuracy.

ROC patent No. I264523 entitled "Method and Device of Interferometer for Measuring Lens Polarity and Skewness" describes a solution, involving, first, enabling the light axis of the interferometer that corresponds to a first mirror surface of the light axis of the lens to be measured to form a particular relation, and also recording a first coefficient; then, turning the lens to be measured 180 degrees, thereby enabling a second mirror surface of the light axis of the lens to be measured to form another particular relation, and also recording a second coefficient; and, last, comparing the first and the second coefficients to calculate the polarity and skewness of the first mirror surface light axis and the second mirror surface light axis.

In the abovementioned method of measuring the polarity and skewness of a lens light axis, although the polarity and skewness of the lens light axis can be obtained accurately by comparing the first and the second coefficients and calculating the correlation therebetween, the method requires two adjustments in the lens and the interferometer. Also, turning the lens to be measured 180 degrees as well as recording and analyzing two parameters are required before obtaining information on errors on the polarity and skewness of the lens to be measured.

In view of the above, although the measuring method is capable of accurately measuring lens polarity or skewness, the method involves multiple steps, thereby greatly increasing measuring time and costs.

Hence, it is a highly urgent issue in the industry to provide a technique that is capable of greatly reducing measuring time and costs, and that is also applicable to testing a plurality of lenses to be measured easily and simultaneously.

SUMMARY OF THE INVENTION

In view of the disadvantages of the prior art mentioned above, it is a primary objective of the present invention to provide a lens measuring device and method applied therein that can accurately measure the quality of a lens quickly and inexpensively.

It is a further objective of the present invention to provide a lens measuring device and method applied therein that can be simultaneously applied to multiple lenses to be measured.

To achieve the aforementioned and other objectives, a lens measuring device is provided according to the present invention, the lens measuring device comprising: a light beam source for emitting light beams; a first polarizer, which receives and polarizes the light beams received from the light beam source; a means for temporarily securing in place one or more lenses to be measured through which the polarized light beams from the first polarizer pass; a second polarizer, which receives and further polarizes the light beams received from the lens being measured; and, an image analysis module, wherein the image analysis module receives the light beams from the second polarizer and acquires image-related information thereof, and then deduces the structural center and energy distribution of the lens being measured by using the image-related information.

In addition, the lens to be measured can be a single optical lens, a lens set serially assembled with a plurality of optical lenses, or a lens array assembled with a plurality of optical lenses in an array arrangement.

In that the rim of a single optical lens is a circle, the structural center of the optical lens is the center of the circle. Furthermore, an optical lens is a symmetrical structure, whose geometric axis is the so-called z-axis passing through the center of the circle. The lens array comprises a plurality of round-shaped lenses, whose rims are circles, and the center of each of the round-shaped lenses is the structural center thereof. Also, each of the round-shaped lenses is a symmetric structure, whose geometric axis is the z-axis passing through the center thereof.

The lens measuring method of the present invention comprises: (1) providing a light beam source, lens to be measured and holding means thereof, a first polarizer, and a second polarizer; (2) enabling the light beam source to pass through the first polarizer to generate a parallel-polarized light beam; (3) enabling the parallel-polarized light beam to pass through the lens to be measured for producing a first light beam; (4) enabling the first light beam to pass through the second polarizer for generating a second light beam to be measured; and (5) analyzing image-related information of the second light beam to be measured, wherein the image-related information is brightness distribution information, energy distribution information, or other numeric information, and then deducing the structural center and energy distribution of the lens to be measured by using the image-related information, and then further analyzing errors in polarity and skewness of the lens to be measured:

Step (5) further comprises: acquiring the rim of the lens to be measured by using the image-related information, and then deducing the structural center based on the acquired rim, and then further comparing the structural center and the energy distribution for making out errors in polarity and skewness of the lens to be measured.

The lens measuring device and method applied therein of the present invention are characterized by adopting a common light beam source to orderly pass through a first polarizer, lens to be measured, a second polarizer for generating a light beam to be measured, and then using an image analysis module to analyze the light beam to be measured for deducing the structural center and the energy distribution of the lens to be measured, thereby achieving the objective of easily and simultaneously testing a plurality of lenses to be measured while avoiding complicated corrections required in the prior art wherein a conventional collimating laser light source is adopted, and further reducing measuring time and costs.

BRIEF DESCRIPTION OF DRAWINGS

The present invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention. Those in the art can readily understand these and other advantages and effects after reading the disclosure of this specification. The present invention can also be performed or applied by other differing embodiments. The details of the specification may be changed on the basis of different points and applications, and numerous modifications and variations can be devised without departing from the spirit of the present invention.

First Embodiment

Figure 1A:
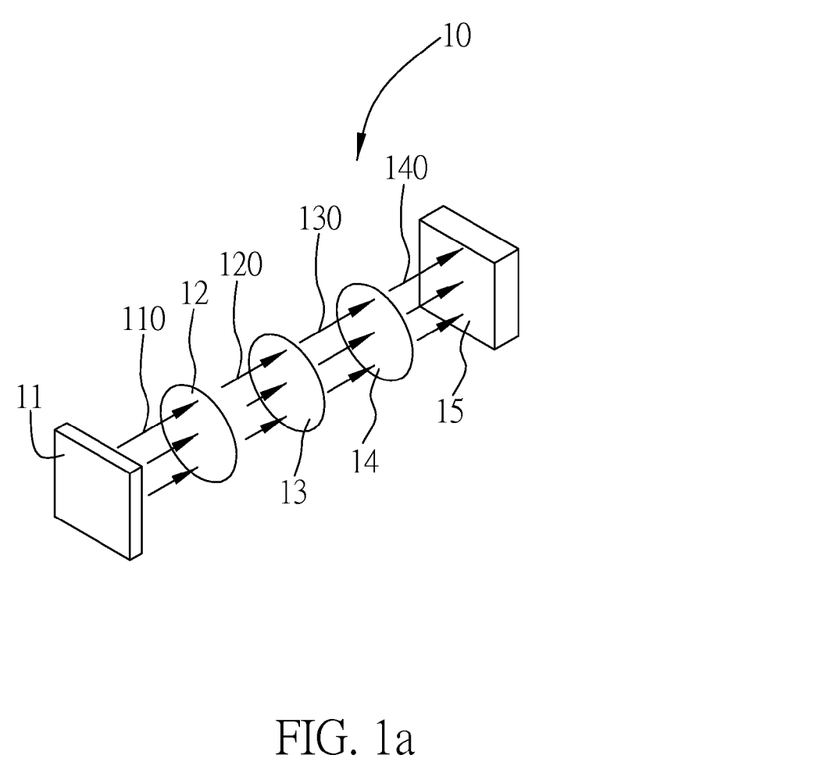
FIG. 1a is a diagram of a first embodiment of the lens measuring device of the present invention.

First, please refer to FIG. 1a, which is a diagram illustrating the first embodiment of the lens measuring device of the present invention. As shown in the figure, the lens measuring device 10 of the present invention comprises: a light beam source 11, which is for generating one or more light beams 110; a first polarizer 12, which is for polarizing the light beams 110 into polarized light beams 120; a means for holding a lens to be measured 13, wherein the first polarized light beams 120 pass through to become first light beams 130; a second polarizer 14, which is for the first light beam 130 to pass through to become a second light beam to be measured 140; and an image analysis module 15.

The polarization directions of the first polarizer 12 and second polarizer 14 can be either perpendicular or parallel to each other; however, when the polarization directions of the first polarizer 12 and the second polarizer 14 are perpendicular to each other, the lens measuring method of the present invention has a better distinguishing effect.

The image analysis module is for receiving the second light beam to be measured 140 as well as for acquiring brightness distribution information, energy distribution information, and/or numeric information of the second light beam to be measured 140, and then deducing the structural center and energy center of the lens to be measured 13 by using this information for further analyzing polarization and skewness of the lens to be measured 13.

Figure 1B:
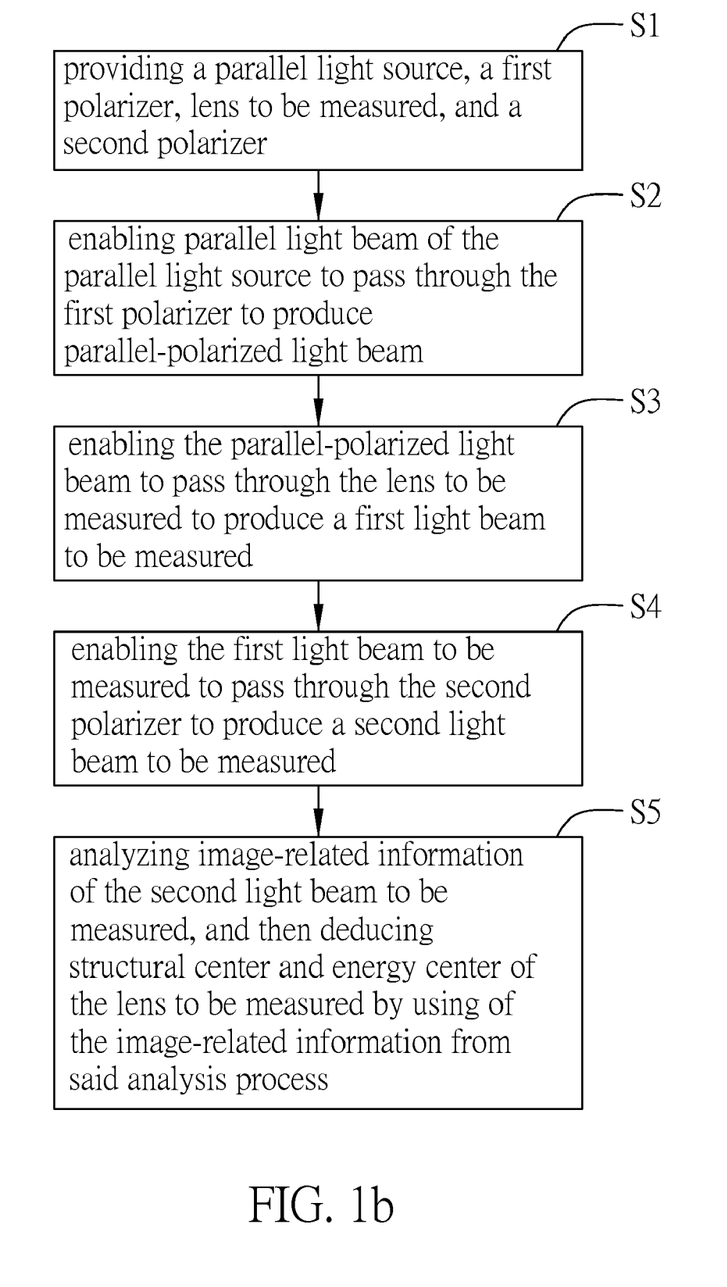
FIG. 1b is a flowchart of the lens measuring method of the present invention.

Please refer to FIG. 1b, which is a flowchart of the lens measuring method of the present invention. As shown in the figure, the lens measuring method of the present invention comprises:

In step S1, providing a light beam source 11, a first polarizer 12, a means to hold a lens as well as a lens to be measured 13, and a second polarizer 14;

In step S2, enabling the light beam 110 of the light beam source 11 to pass through the first polarizer 12 to become a parallel-polarized light beam 120;

In step S3, enabling the parallel-polarized light beam 120 to pass through the lens to be measured 13 to become a first light beam 130;

In the step S4, enabling the first light beam 130 to pass through the second polarizer 14 to become a second light beam to be measured 140;

In the step S5, analyzing image-related information of the second light beam to be measured 140, and then further deducing the structural center and energy center of the lens to be measured 130 by using the image-related information.

It should be noted herein, the present invention adopts two main concepts: first, the structural center of a round lens is the center of the outline of the round lens; and, second, for a standard symmetrical round lens that is symmetric along the z-axis of the structural center thereof, after a parallel-incident light ray, which is propagating parallel to the light axis of the round lens, falls on the round lens, the location of the energy center and the structural center of the symmetrical round lens should coincide at one point.

Figure 1C:
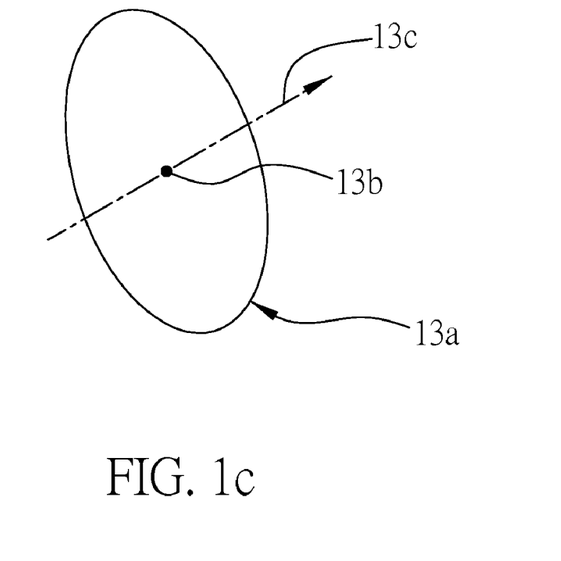
FIG. 1c is a perspective diagram showing an optical lens being measured by the lens measuring method of the present invention.

FIG. 1c, which shows a diagram of a standard optical lens 13, illustrates the first concept. The outline of the rim 13a of the optical lens 13 of the present embodiment is a circle, and the structural center 13b of the optical lens 13 is the center of the circle formed by the outline rim 13a. Therefore, if the optical lens 13 is a standard lens, the optical lens 13 should be a symmetrical structure, whose geometric axis is a z-axis 13c passing through the structural center 13b.

Further, upon causing a light beam to pass through a single optical lens 13, a round image of the outline of the rim of the lens 13a is clearly formed and impinges on the image analysis module 15. Next, the center of the optical lens 13 is further obtained by the image analysis module by using the round image, thereby defining the structural center 13b of the optical lens 13 upon projection of the round image.

Figure 2A:
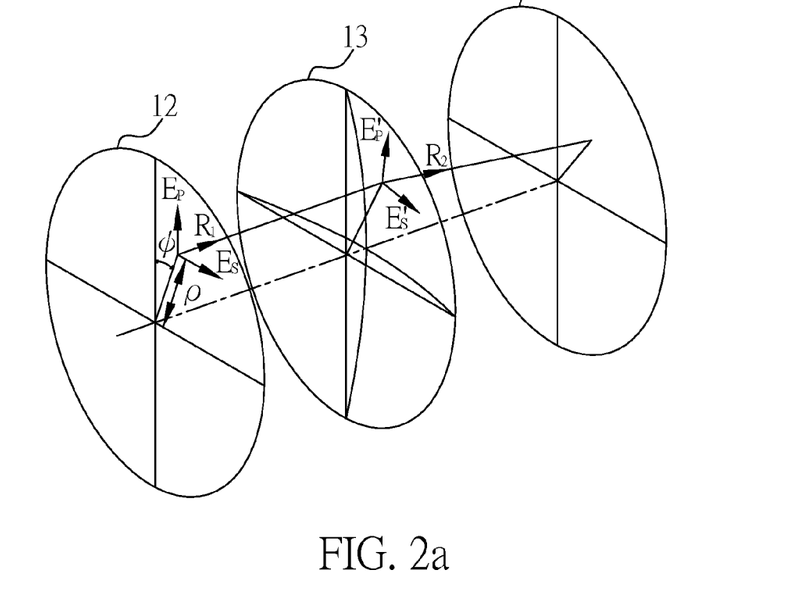
FIG. 2a is a diagram of optical lens polarization measurement.
Figure 2B:
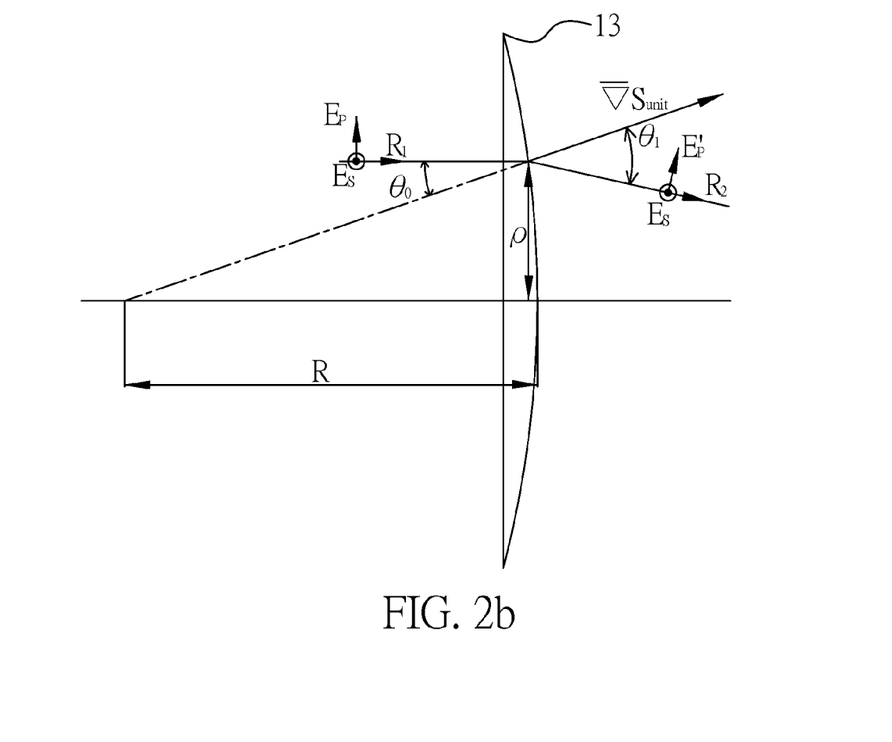
FIG. 2b is a diagram illustrating the relation between an incident light ray and a refracted light ray.

Meanwhile, according to the second concept pertaining to the energy center and symmetrical structure, first, please refer to FIG. 2a, which is a diagram of optical lens polarization measurement, and FIG. 2b, which is a diagram illustrating incident light and refracted light. Snell's Law states that electromagnetic waves must satisfy electric field continuity at a boundary according to the following equation:

$$n_0 \sin \theta_0 = n_1 \sin \theta_1$$

And the Fresnel Equations illustrate that the amplitude of refracted electromagnetic wave has various amplitudes corresponding to different incident angles the equations being:

$$t_s = \frac{E'_s}{E_s} = \frac{2 \sin \theta_1 \cos \theta_0}{\sin(\theta_0 + \theta_1)} \text{ and}$$

$$t_p = \frac{E'_p}{E_p} = \frac{2 \sin \theta_1 \cos \theta_0}{\sin(\theta_0 + \theta_1) \cos(\theta_0 - \theta_1)}$$

wherein s is the polarization direction perpendicular to the incident plane, and p is the polarization direction parallel to the incident plane.

Also according to the Fresnel Equations, the energy of the second light beam to be measured of FIG. 1 can be indicated by a Jones vector as:

$$\begin{bmatrix} E'_s \\ E'_p \end{bmatrix} = \begin{bmatrix} 0 & 0 \\ 0 & 1 \end{bmatrix} \begin{bmatrix} \cos\phi & \sin\phi \\ -\sin\phi & \cos\phi \end{bmatrix} \begin{bmatrix} t_s & 0 \\ 0 & t_p \end{bmatrix} \begin{bmatrix} \cos\phi & -\sin\phi \\ \sin\phi & \cos\phi \end{bmatrix} \begin{bmatrix} 1 & 0 \\ 0 & 0 \end{bmatrix} \begin{bmatrix} E_s \\ E_p \end{bmatrix} \text{ or}$$

$$\begin{bmatrix} E'_s \\ E'_p \end{bmatrix} = \begin{bmatrix} 1 & 0 \\ 0 & 0 \end{bmatrix} \begin{bmatrix} \cos\phi & \sin\phi \\ -\sin\phi & \cos\phi \end{bmatrix} \begin{bmatrix} t_s & 0 \\ 0 & t_p \end{bmatrix} \begin{bmatrix} \cos\phi & -\sin\phi \\ \sin\phi & \cos\phi \end{bmatrix} \begin{bmatrix} 1 & 0 \\ 0 & 0 \end{bmatrix} \begin{bmatrix} E_s \\ E_p \end{bmatrix}$$

wherein $E_s$ and $E_p$ are the amplitudes of the perpendicular and parallel electric fields of incident light respectively, and the Jones vectors and the Fresnel Equations can be used to fully express simulation equations of optical lens polarization measurement.

Moreover, according to the electromagnetic principle indicating that brightness is in direct proportion to the square of the electric field, the brightness distribution passing through optical equipment can be expressed as:

$$I(\rho,\phi) = E_s^2 \sin^2\phi \cos^2\phi (t_s - t_p)^2$$

wherein $\rho$ is the incidence height of the incident light falling on the lens to be measured. Since the unit of brightness is watts/m², energy passing through the optical lens system can be obtained by calculating the integral area of the lens. Accordingly, the energy distribution can be expressed via said brightness distribution equation, and also the symmetric status of the energy distribution can be obtained.

By further deduction, the energy center of the lens to be measured can be expressed as:

$$C_x = \frac{\int_0^{yboundary} \int_0^{xboundary} x I(x,y) dx dy}{\int_0^{yboundary} \int_0^{xboundary} I(x,y) dx dy} = \frac{\int_0^{yboundary} \int_0^{xboundary} x I(x,y) dx dy}{\text{flux}}$$

and $$C_y = \frac{\int_0^{yboundary} \int_0^{xboundary} y I(x,y) dx dy}{\int_0^{yboundary} \int_0^{xboundary} I(x,y) dx dy} = \frac{\int_0^{yboundary} \int_0^{xboundary} y I(x,y) dx dy}{\text{flux}}$$

wherein $C_x$ and $C_y$ indicate the energy centers of optical lens in the x-direction and the y-direction, respectively.

Please further refer to FIG. 2b, which is a diagram illustrating that the structural center and the energy center of a polarized or skewed lens cannot overlap. As shown in the figure, when a lens to be measured has an error in polarity, the brightness distribution shows an uneven image on both sides, namely the energy center and the structural center cannot overlap to each other.

In addition, when a lens to be measured has an error in skewness, the brightness distribution manifests an asymmetric image with a distorted brightness area. Therefore, according to the technique of the present invention involving analyzing the image-related information of the second light beam to be measured and then calculating image-related information, errors in skewness and polarity of lenses resulting during manufacture can be quickly obtained.

Second Embodiment

Figure 3A:
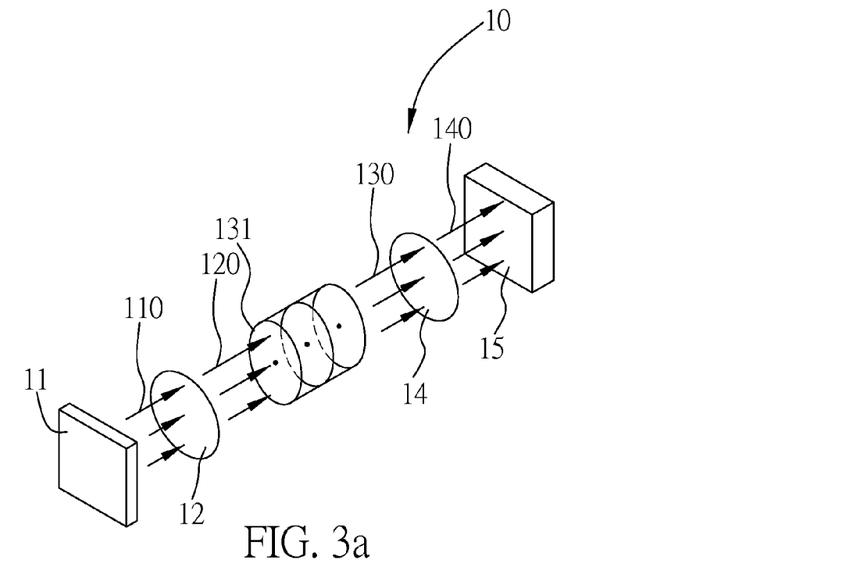
FIG. 3a is a diagram of a second embodiment of the lens measuring device of the present invention.

Please refer to FIG. 3a, which is a diagram of the second embodiment of the lens measuring device of the present invention. The equipment and concepts of the present embodiment are mostly similar to that of the first embodiment, the difference being that the lens to be measured 13 in the first embodiment is replaced with a lens set to be measured 131 that is a serially-assembled plurality of optical lenses. In other words, the present embodiment has a plurality of lenses to be measured, and the plurality of lenses to be measured make up a lens set to be measured 131 such as common compound camera lenses. Then, analysis of the lens set to be measured 131 is performed by using the device and method disclosed in the first embodiment.

Figure 3B:
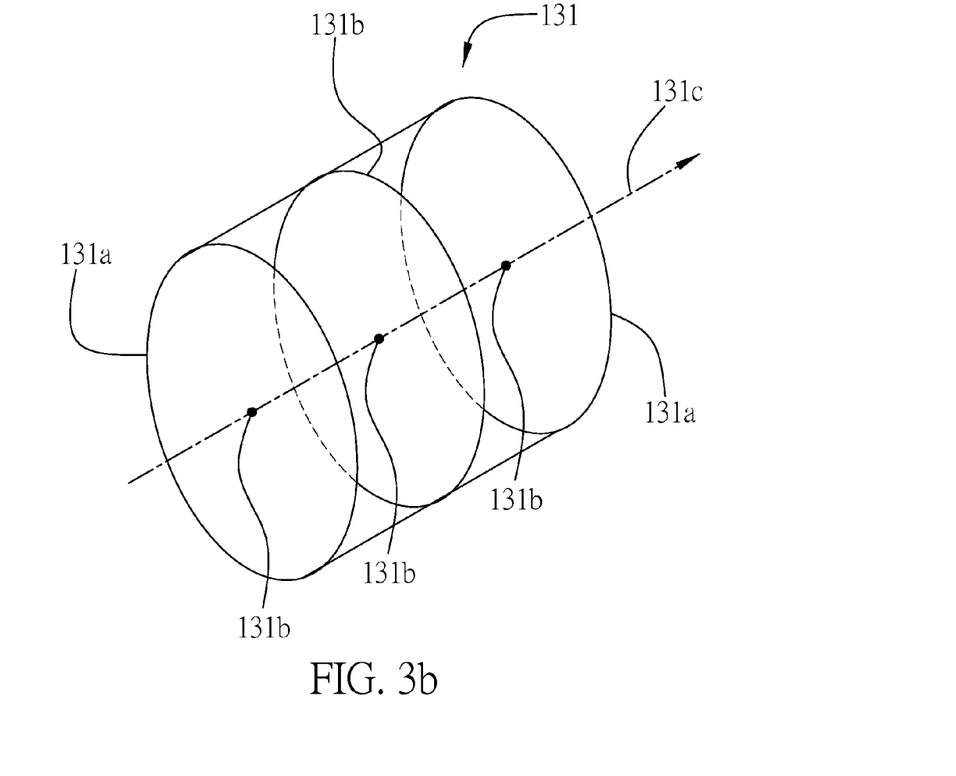
FIG. 3b is a diagram illustrating a lens set to be measured serially assembled with a plurality of optical lenses.

Please further refer to FIG. 3b, which is a diagram illustrating a lens set to be measured 131 that is serially assembled with a plurality of optical lenses. Preferably, the outline of the rim 131a of the lens set to be measured 131 is a circle, wherein the structural center 131b of the lens set to be measured 131 is the center of the circle. Moreover, if the lens set to be measured 131 is a standard lens set, the lens set is a symmetrical structure, whose geometric axis is the z-axis 131c passing through the center of the circle. Thus, the equipment and method disclosed for the first embodiment of the invention is also applicable for measuring the polarity and skewness of a lens set to be measured 131 of the serially-assembled plurality of optical lenses of the second embodiment.

Third Embodiment

Figure 4A:
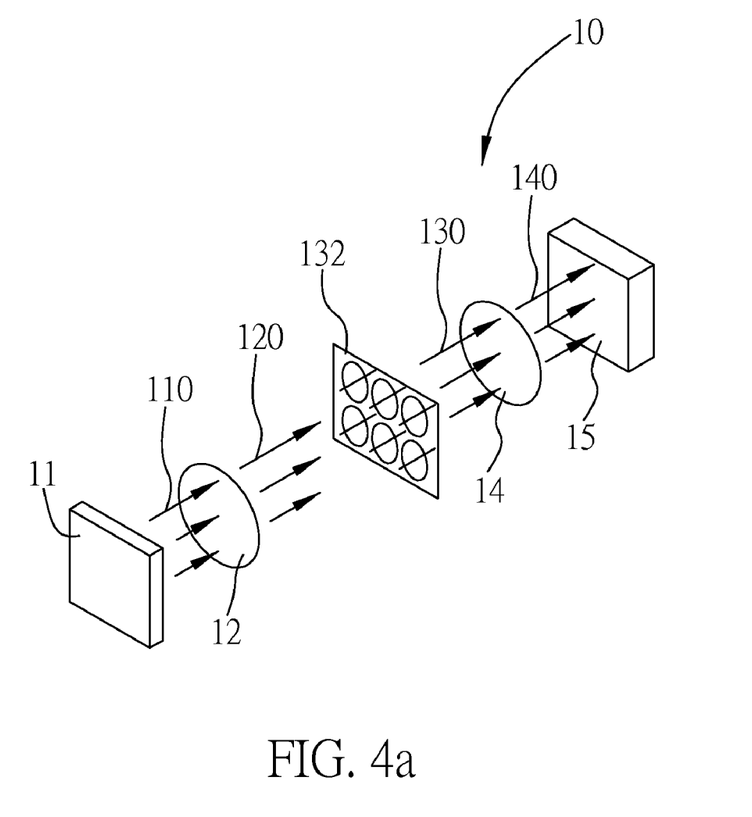
FIG. 4a is a third embodiment of the lens measuring device of the present invention.

Please refer to FIG. 4a, which is a diagram of the third embodiment of the lens measuring device of the present invention. The equipment and concepts of the present embodiment are mostly similarly to that of the first embodiment, the difference being that the lens to be measured 13 in the first embodiment is replaced with a lens array 132 assembled with a plurality of optical lenses in an array arrangement. Please further refer to FIG. 4b, which is a diagram illustrating a lens array 132 assembled with a plurality of optical lenses 1320 in an array arrangement. As shown in the figures, the present invention is also applicable for measuring errors in polarity and skewness of a lens array 132 that is assembled with a plurality of optical lenses 1320 in an array arrangement.

Figure 4B:
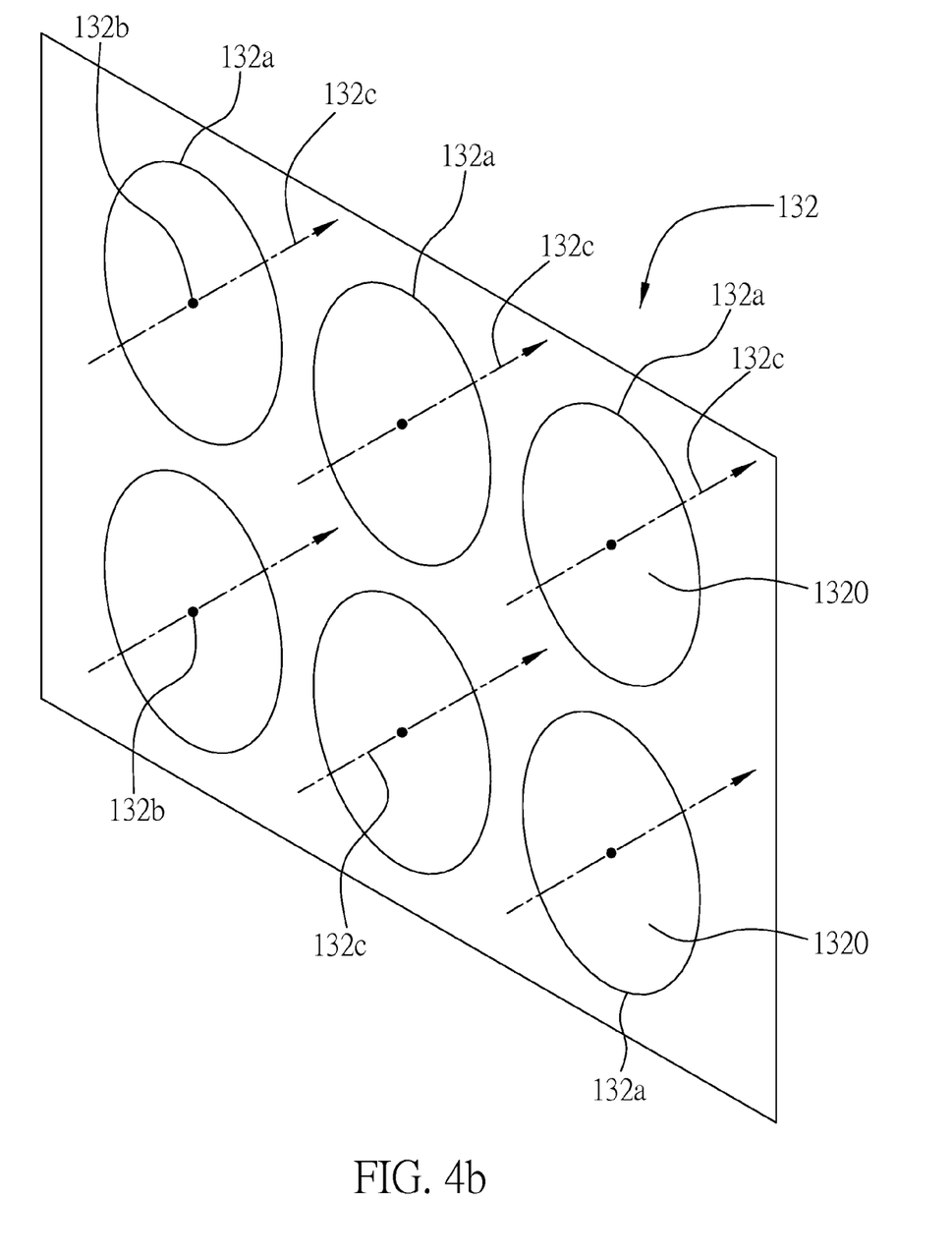
FIG. 4b is a diagram illustrating a lens array assembled with a plurality of optical lenses in an array arrangement.

However, the lens array 132 comprises a plurality of optical lenses 1320, and, preferably, the outline of the rim of each optical lens 1320 is a circle, wherein the structural center 132b of the optical lens 1320 is the center of the circle. Moreover, if the optical lenses 1320 of the lens set to be measured 132 are standard lenses, each of the optical lenses 1320 is a symmetrical structure, whose geometric axis is the z-axis passing through the center of the circle. Thus, the equipment and method of the first embodiment is applicable to measuring the polarity and skewness of such a lens array.

Fourth Embodiment

The principles of the first through third embodiments may also be combined in a fourth embodiment. The lens measuring device 10 of the fourth embodiment of the present invention comprises a fixing component, the fixing component being for positioning the first polarizer 12, the lens to be measured 13, the second polarizer 14, and/or lens set to be measured 132 to preset positions, and for keeping said elements in the preset positions. Since the fixing component is known in the prior art and not a technical feature of the present invention, no detailed description is given herein.

In summary, the lens measuring device and method applied therein of the present invention are characterized by adopting a common light beam source; orderly passing the light beam though a first polarizer, lens to be measured, a second polarizer to become a light beam to be measured; and further analyzing the light beam to be measured by using an analysis module for deducing the structural center and energy center of the lens to be measured. Thereby, the invention achieves the objectives of easily and simultaneously testing a plurality of lenses to be measured while avoiding complicated corrections required in the prior art wherein a conventional collimating laser light source is adopted, thus further reducing measuring time and costs.

The foregoing descriptions of the detailed embodiments are only illustrated to disclose the features and functions of the present invention and are not restrictive of the scope of the present invention. It should be understood to those in the art that various modifications and variations according to the spirit and principle in the disclosure of the present invention fall within the scope of the appended claims.

What is claimed is:

1. A lens measuring method, which comprises:
    (1) providing a light beam source, lens to be measured, a first polarizer, and a second polarizer;
    (2) enabling the light beam source to pass through the first polarizer, thereby generating a parallel-polarized light beam;
    (3) enabling the parallel-polarized light beam to pass through the lens to be measured, thereby generating a first light beam;
    (4) enabling the first light beam to pass through the second polarizer, thereby generating a second light beam to be measured; and
    (5) acquiring and analyzing image-related information of the second light beam to be measured, deducing an outline of a rim of the lens to be measured by using the image-related information, and then further deducing the structural center of the lens to be measured by using the outline of the rim and energy distribution of the lens to be measured.

2. The lens measuring method of claim 1, wherein the polarization directions of the first polarizer and the second polarizer are perpendicular or parallel to each other.

3. The lens measuring method of claim 1, wherein the image-related information includes the brightness distribution, energy distribution, and/or other numerical information.

4. The lens measuring method of claim 3, wherein the brightness distribution, the energy distribution, and/or the other numerical information can be obtained according to the equations $$\begin{bmatrix} E'_s \\ E'_p \end{bmatrix} = \begin{bmatrix} 1 & 0 \\ 0 & 0 \end{bmatrix} \begin{bmatrix} \cos\phi & \sin\phi \\ -\sin\phi & \cos\phi \end{bmatrix} \begin{bmatrix} t_s & 0 \\ 0 & t_p \end{bmatrix} \begin{bmatrix} \cos\phi & -\sin\phi \\ \sin\phi & \cos\phi \end{bmatrix} \begin{bmatrix} 1 & 0 \\ 0 & 0 \end{bmatrix} \begin{bmatrix} E_s \\ E_p \end{bmatrix}$$

and $$I(\rho, \phi) = E_s^2 \sin^2\phi \cos^2\phi (t_s - t_p)^2$$

wherein, $E_s$ and $E_p$ are the vibration amplitudes of the parallel and vertical electric fields of incident light rays, and $\rho$ is incident height of the incident light falling on the lens to be measured.

5. The lens measuring method of claim 1, wherein step (5) further comprises: acquiring the energy center according to the energy distribution.

6. The lens measuring method of claim 5, wherein the energy center can be acquired from the equations:

$$C_x = \frac{\int_0^{yboundary} \int_0^{xboundary} xI(x,y)\,dx\,dy}{\int_0^{yboundary} \int_0^{xboundary} I(x,y)\,dx\,dy}$$
$$= \frac{\int_0^{yboundary} \int_0^{xboundary} xI(x,y)\,dx\,dy}{flux}$$

and $$C_y = \frac{\int_0^{yboundary} \int_0^{xboundary} yI(x,y)\,dx\,dy}{\int_0^{yboundary} \int_0^{xboundary} I(x,y)\,dx\,dy}$$
$$= \frac{\int_0^{yboundary} \int_0^{xboundary} yI(x,y)\,dx\,dy}{flux}$$

wherein $C_x$ and $C_y$ are the energy centers of an optical lens in the x-direction and the y-direction, respectively.

7. The lens measuring method of claim 1, wherein step (5) further comprises: comparing the structural center and the energy distribution, and then evaluating errors in polarity and skewness of the lens to be measured.

8. The lens measuring method of claim 1, wherein the outline of the rim of the lens to be measured is a circle, and the structural center of the lens to be measured is the center of the circle.

9. The lens measuring method of claim 8, wherein the lens to be measured is a symmetrical structure, whose geometric axis is the z-axis passing through the center of the circle.

10. The lens measuring method of claim 1, wherein the lens to be measured comprises a plurality of lenses to be measured, the plurality of lenses to be measured forming a lens set to be measured.

11. The lens measuring method of claim 10, wherein the outline of the rim of the lens set to be measured is a circle, and the structural center of the lens set to be measured is the center of the circle.

12. The lens measuring method of claim 11, wherein the lens set to be measured is a symmetrical structure, whose geometric axis is the z-axis passing through the center of the circle.

13. The lens measuring method of claim 1, wherein the lens to be measured is a lens array.

14. The lens measuring method of claim 13, wherein the lens array comprises a plurality of round lenses, in which the outline of the rim of each lens is a circle, and the center of each of the round lenses is the structural center thereof.

15. The lens measuring method of claim 14, wherein each of the round lenses is a symmetrical structure, and each of the round lenses has a geometric axis that is a z-axis passing through the center of each round lens.

16. A lens measuring device, which comprises at least:
    a light beam source, which is for generating light beams;
    a first polarizer, which receives and polarizes the light beams from the light source such that it emits polarized parallel light beams;
    a means for temporarily securing in place one or more lenses to be measured through which the light beams received from the first polarizer pass;

a second polarizer, which receives and further polarizes the light beams from the lens being measured to thus form the final light beams to be measured; and an image analysis module, which receives the light beams from the second polarizer, and also acquires image-related information of the received light beams, deduces an outline of a rim of the lens being measured by using the image-related information, and then deduces the structural center of the lens being measured by using the outline of the rim and energy distribution of the lens being measured by using the image-related information.

17. The lens measuring device of claim 16, wherein the polarization directions of the first polarizer and the second polarizer are perpendicular to each other.

18. The lens measuring device of claim 16, wherein the polarization directions of the first polarizer and the second polarizer are parallel to each other.

19. The lens measuring device of claim 16, wherein the image-related information is the brightness distribution, energy distribution, or other numeric information.

* * * * *